United States Patent
Nasu et al.

(10) Patent No.: US 11,420,233 B2
(45) Date of Patent: Aug. 23, 2022

(54) SORTING APPARATUS, LOGISTIC SYSTEM, AND CONTROL DEVICE

(71) Applicants: NEC CORPORATION, Tokyo (JP); Tomonari Furukawa, Charlottesville, VA (US); Tahsin Mullick, Charlottesville, VA (US)

(72) Inventors: Yasuyuki Nasu, Tokyo (JP); Tomonari Furukawa, Charlottesville, VA (US); Tahsin Mullick, Charlottesville, VA (US)

(73) Assignees: NEC CORPORATION, Tokyo (JP); Tomonari Furukawa, Charlottesville, VA (US); Tashin Mullick, Charlottesville, VA (US)

( * ) Notice: Subject to any disclaimer, the term of this patent is extended or adjusted under 35 U.S.C. 154(b) by 143 days.

(21) Appl. No.: 16/786,247

(22) Filed: Feb. 10, 2020

(65) Prior Publication Data
US 2021/0245204 A1 Aug. 12, 2021

(51) Int. Cl.
| B07C 5/16 | (2006.01) |
| B07C 5/36 | (2006.01) |
| B65G 47/46 | (2006.01) |
| B07C 3/08 | (2006.01) |
| B07C 3/00 | (2006.01) |
| B07C 5/04 | (2006.01) |

(52) U.S. Cl.
CPC .............. *B07C 5/362* (2013.01); *B07C 3/003* (2013.01); *B07C 3/08* (2013.01); *B07C 5/04* (2013.01); *B07C 5/16* (2013.01); *B65G 47/46* (2013.01)

(58) Field of Classification Search
CPC .. B07C 5/362; B07C 5/16; B07C 3/08; B07C 5/04; B07C 3/003; B65G 47/46
See application file for complete search history.

(56) References Cited

U.S. PATENT DOCUMENTS

| 8,919,529 | B1 * | 12/2014 | Erceg | B65G 47/962 |
| | | | | 198/360 |
| 10,358,298 | B2 * | 7/2019 | Schroader | B07C 3/08 |
| 10,766,711 | B2 * | 9/2020 | Lundahl | B65G 43/10 |
| 11,045,839 | B1 * | 6/2021 | Kim | B07C 3/18 |
| 2004/0073333 | A1 * | 4/2004 | Brill | B65G 47/38 |
| | | | | 700/224 |

FOREIGN PATENT DOCUMENTS

| JP | 04-112125 A | 4/1992 | |
| WO | WO-2019164161 A1 * | 8/2019 | ........... B65G 13/071 |

* cited by examiner

*Primary Examiner* — Patrick H Mackey
(74) *Attorney, Agent, or Firm* — Sughrue Mion, PLLC

(57) ABSTRACT

A sorting apparatus includes a conveyance unit that conveys a plurality of packages and a sorting unit that is configured to sort the plurality of packages on the basis of a delivery destination, a size, and a weight such that the plurality of packages are sorted as first packages and second packages, and the sorting unit is configured to sort the packages lighter and smaller than the second packages as the first packages.

8 Claims, 11 Drawing Sheets

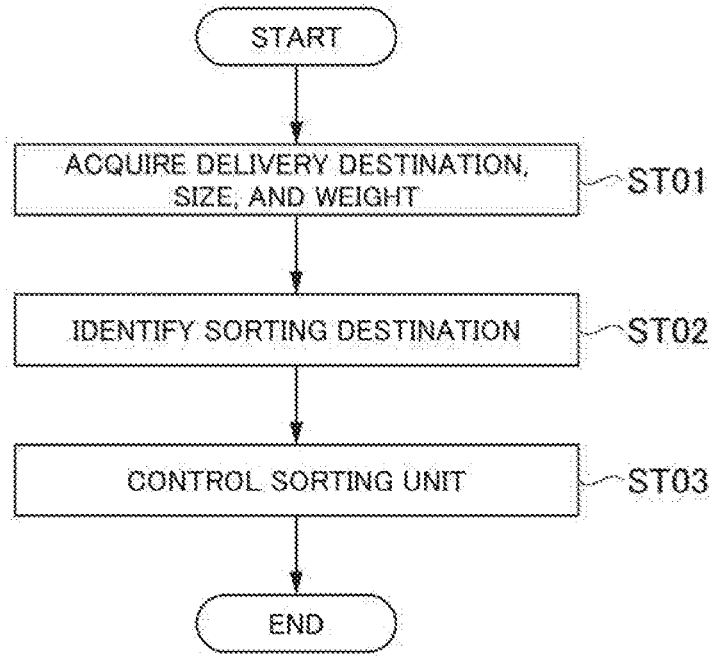
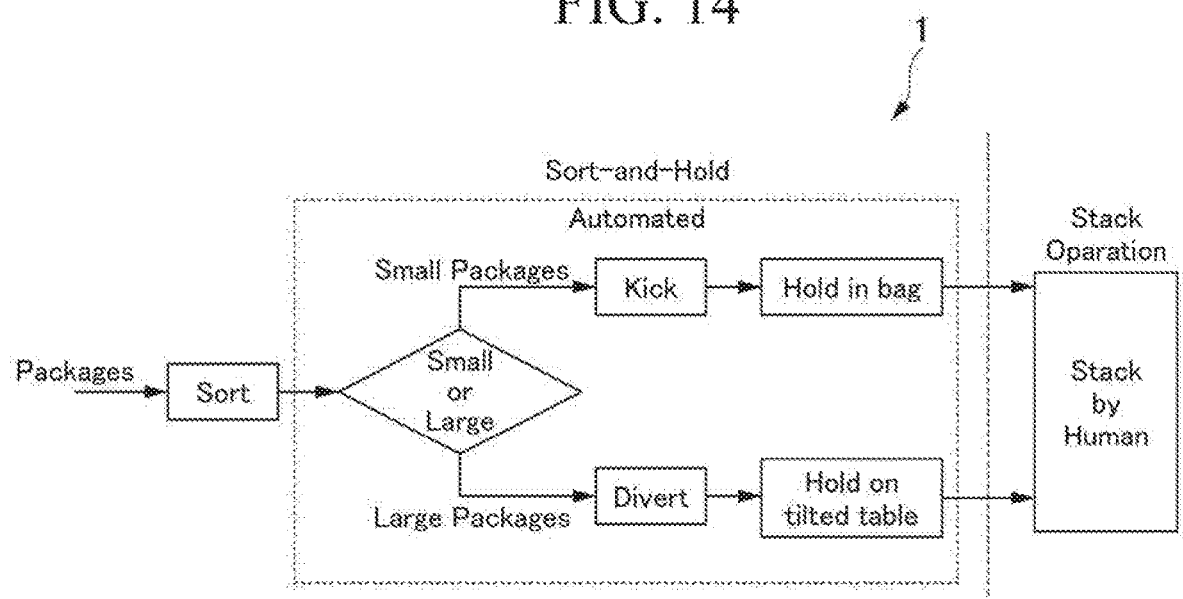

SORTING APPARATUS, LOGISTIC SYSTEM, AND CONTROL DEVICE

TECHNICAL FIELD

The present disclosure relates to a sorting apparatus, a logistic system, and a control device.

BACKGROUND ART

In a logistic center and the like, sorting packages using a sorting apparatus is known.

As a sorting apparatus, for example, there is a sorting apparatus as disclosed in Japanese Unexamined Patent Application, First Publication No. H04-112125 (hereinafter Patent Document 1).

SUMMARY

An example object of the present disclosure is to provide a sorting apparatus and a logistic system that reduce a burden on an operator.

According to an example aspect of the present disclosure, there is provided a sorting apparatus that includes a conveyance unit that conveys a plurality of packages and a sorting unit that is configured to sort the plurality of packages on the basis of a delivery destination, a size, and a weight such that the plurality of packages are sorted as first packages and second packages, and the sorting unit is configured to sort the packages lighter and smaller than the second packages as the first packages.

According to an example aspect of the present disclosure, there is provided a control device including: an acquisition unit that is configured to acquire a delivery destination, a size, and a weight of each package for a plurality of packages conveyed by a conveyance unit; a sorting destination identifying unit that is configured to identify a sorting destination of each package on the basis of the delivery destination, the size, and the weight such that the plurality of packages are sorted as first packages and second packages; and a sorting control unit that is configured to control the sorting unit such that each package is sorted according to the identified sorting destination, and the sorting destination identifying unit is configured to sort the packages lighter and smaller than the second packages as the first packages.

BRIEF DESCRIPTION OF THE DRAWINGS

FIG. 13 is a flowchart of a method of controlling a sorting unit according to an example embodiment.

FIG. 14 is a diagram showing an operation of a sorting apparatus according to an example embodiment.

EXAMPLE EMBODIMENT

Hereinafter, various example embodiments according to the present disclosure will be described with reference to the drawings.

First Example Embodiment

Hereinafter, an example embodiment according to the present disclosure will be described with reference to FIGS. 1 to 14.

A sorting apparatus 2 is an apparatus configuring a part of a logistic system 1 applied to a logistic center and the like.

The sorting apparatus 2 sorts packages PG flowing in the logistic system 1.

Figure 1:
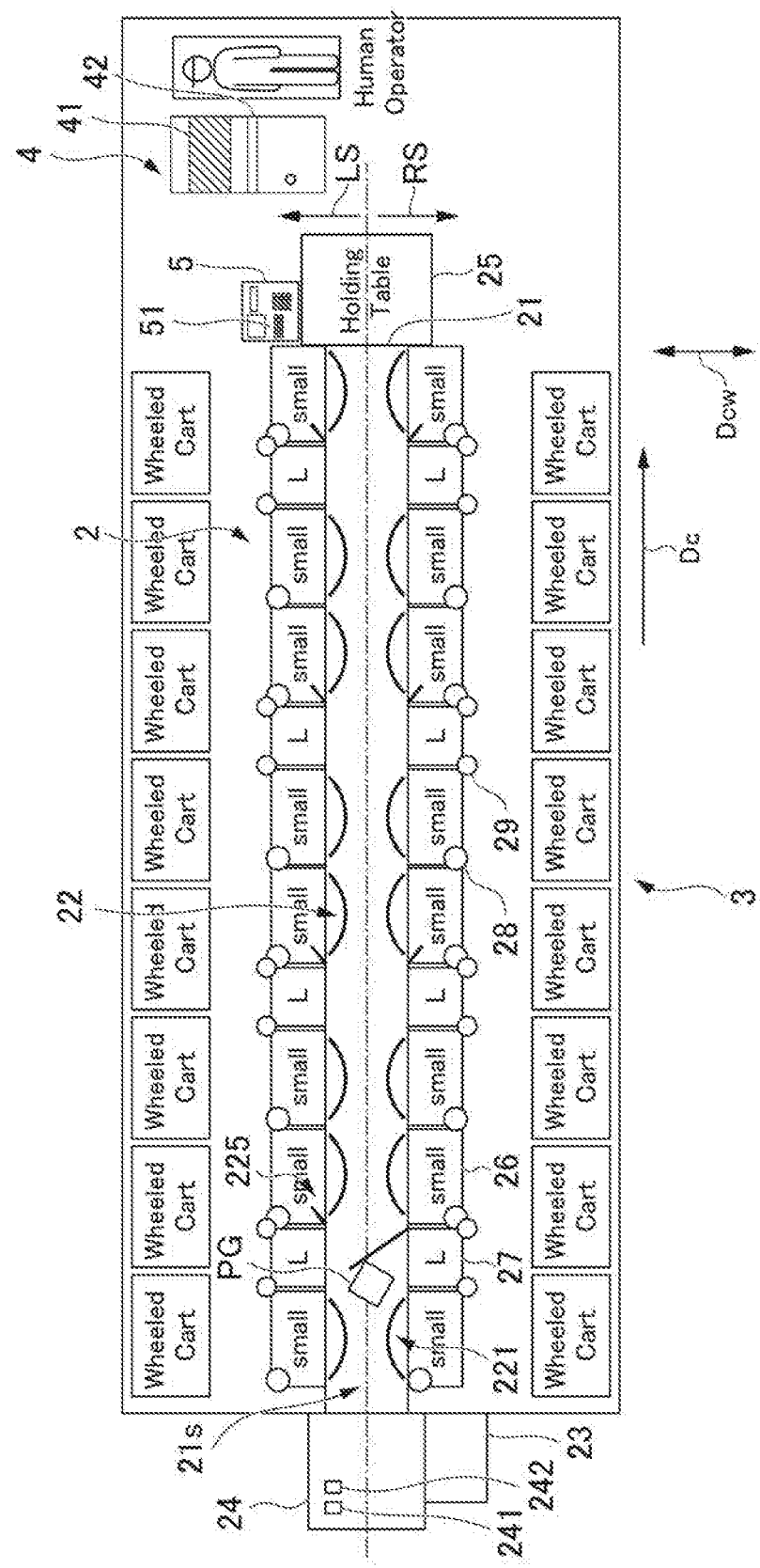
FIG. 1 is a plan view of a sorting apparatus according to an example embodiment.

As shown in FIG. 1, the logistic system 1 includes the sorting apparatus 2 and a plurality of wheeled carts 3.

For example, the logistic system 1 may further include a base station 4 and a control panel 5.

(Configuration of Sorting Apparatus)

The sorting apparatus 2 includes a conveyance unit 21 and a sorting unit 22.

For example, the sorting apparatus 2 may further include a control device 23, a sensor unit 24, and a holding table 25.

In addition, the sorting apparatus 2 may include a first table 26, a second table 27, a first notification unit 28, and a second notification unit 29.

(Configuration of Conveyance Unit)

The conveyance unit 21 conveys a plurality of packages PG.

For example, the conveyance unit 21 may include a conveyance face 21s extending in a conveyance direction Dc.

In addition, on the conveyance face 21s, the conveyance unit 21 may sequentially convey a plurality of packages PG flowing in the logistic system 1 in the conveyance direction Dc.

In addition, the conveyance unit 21 may be a belt conveyer, a roller conveyer, or the like.

Hereinafter, a direction from the sensor unit 24 to the holding table 25 will be referred to as a conveyance direction Dc.

In addition, in the conveyance face 21s, a direction orthogonal to the conveyance direction Dc will be referred to as a conveyance width direction Dcw.

Furthermore, a right side of the conveyance unit 21 when seen from an upstream side in the conveyance direction Dc will be simply referred to as "a right side RS of the conveyance unit 21," and a left side of the conveyance unit 21 when seen from the upstream side in the conveyance direction Dc will be simply referred to as "a left side LS of the conveyance unit 21."

(Configuration of Sorting Unit)

The sorting unit 22 sorts a plurality of packages PG on the basis of a delivery destination AD, a size SPG, and a weight WPG such that the plurality of packages PG are sorted as first packages PG1 and second packages PG2.

The sorting unit 22 sorts packages PG that are lighter and smaller than the second packages PG2 as the first packages PG1.

For example, the sorting unit 22 may sort the first packages PG1 into each delivery destination AD.

In addition, the sorting unit 22 may sort the second packages PG2 into each delivery destination AD.

Furthermore, the sorting unit 22 may include a first sorting mechanism 221 and a second sorting mechanism 225.

For example, the sorting unit 22 may sort the first packages PG1 into the first table 26.

At that time, the control device 23 may control the first sorting mechanism 221 disposed in the first table 26 relating to the delivery destination AD of the first packages PG1 such that the first packages are sorted into the first table 26 relating to the delivery destination AD of the first packages PG1 among a plurality of first tables 26.

For example, the sorting unit 22 may sort the second packages PG2 into the second table 27.

At that time, the control device 23 may control the second sorting mechanism 225 disposed in the second table 27 relating to the delivery destination AD of the second packages PG2 such that the second packages are sorted into the second table 27 relating to the delivery destination AD of the second packages PG2 among a plurality of second tables 27.

For example, the sorting unit 22 may sort packages PG into 16 delivery destinations AD as delivery destinations AD relating to each wheeled cart 3. At that time, the delivery destinations AD may be different from each other, or some may be the same delivery destination AD.

Figure 2:
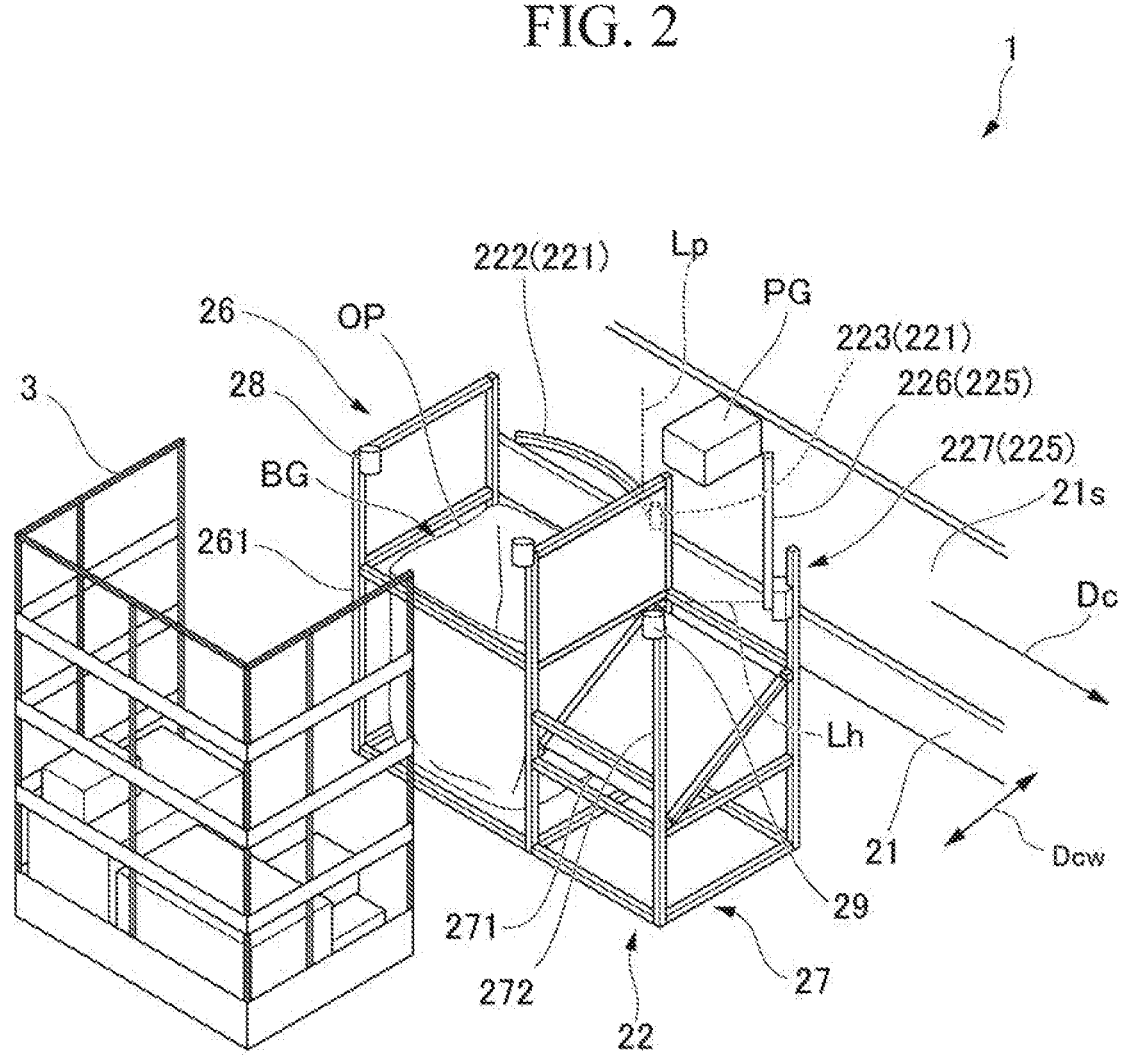
FIG. 2 is a major-part perspective view of a sorting apparatus according to an example embodiment.
Figure 3:
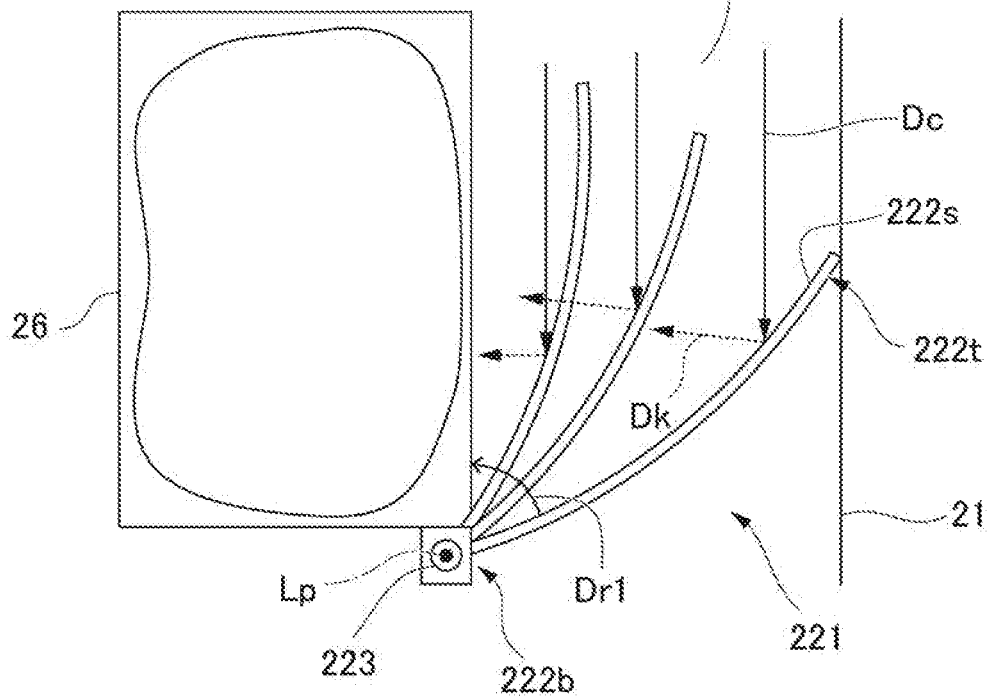
FIG. 3 is a plan view of a first sorting mechanism according to an example embodiment.

As shown in FIGS. 2 and 3, the first sorting mechanism 221 includes a first arm 222 and a first rotation shaft 223.

The first arm 222 kicks the first package PG1 toward the first table 26.

As shown in FIG. 3, the first arm 222 includes a first arm base end 222b and a first arm tip end 222t.

The first arm 222 extends from the first arm base end 222b toward the first arm tip end 222t.

The first arm 222 further includes a first working surface 222s between the first arm base end 222b and the first arm tip end 222t.

For example, the first arm 222 has a shape extending along a circular arc and has the first working surface 222s on the inner circumference side of the circular arc.

The first rotation shaft 223 is disposed on the downstream side of the first table 26 in the conveyance direction Dc.

The first arm base end 222b is fixed to the first rotation shaft 223.

The first rotation shaft 223 is driven to rotate around a perpendicular line Lp extending perpendicular to the conveyance face 21s in accordance with an instruction from the control device 23.

For example, the first rotation shaft 223 may be a rotation shaft of a motor or the like.

In this way, the first arm 222 is driven to rotate around the perpendicular line Lp on the conveyance face 21s along the conveyance face 21s.

In accordance with rotation driving of the first rotation shaft 223, when the first working surface 222s rotates in a first rotation direction Dr1 toward the first table 26, the first working surface 222s starts to kick a first package PG1 flowing in the conveyance direction Dc on the conveyance face 21s in a kicking direction Dk.

Figure 4:
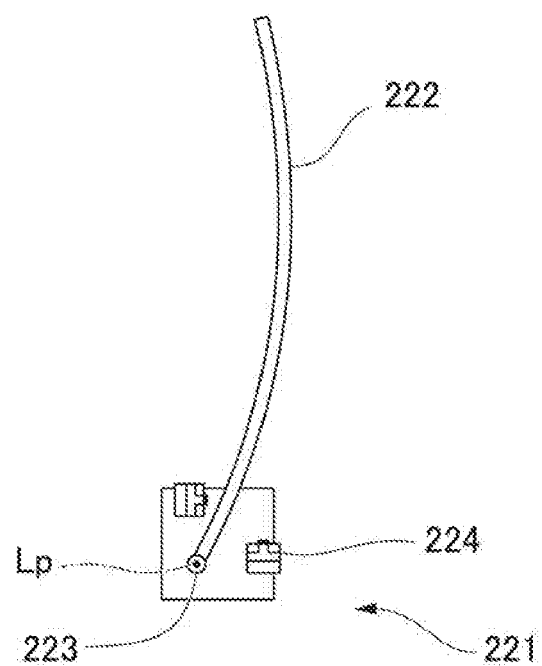
FIG. 4 is a detailed plan view of a first sorting mechanism according to an example embodiment.

For example, as shown in FIG. 4, the first sorting mechanism 221 may further include one pair of limiter switches 224 having the first arm 222 interposed therebetween in a direction along the conveyance face 21s.

In order for the first arm 222 to rotate over each limiter switch 224, each limiter switch 224 turns on, and the rotation driving of the first arm 222 stops.

In accordance with this, the first arm 222 is driven to rotate within a range in which it is interposed between one pair of limiter switches 224.

Figure 5:
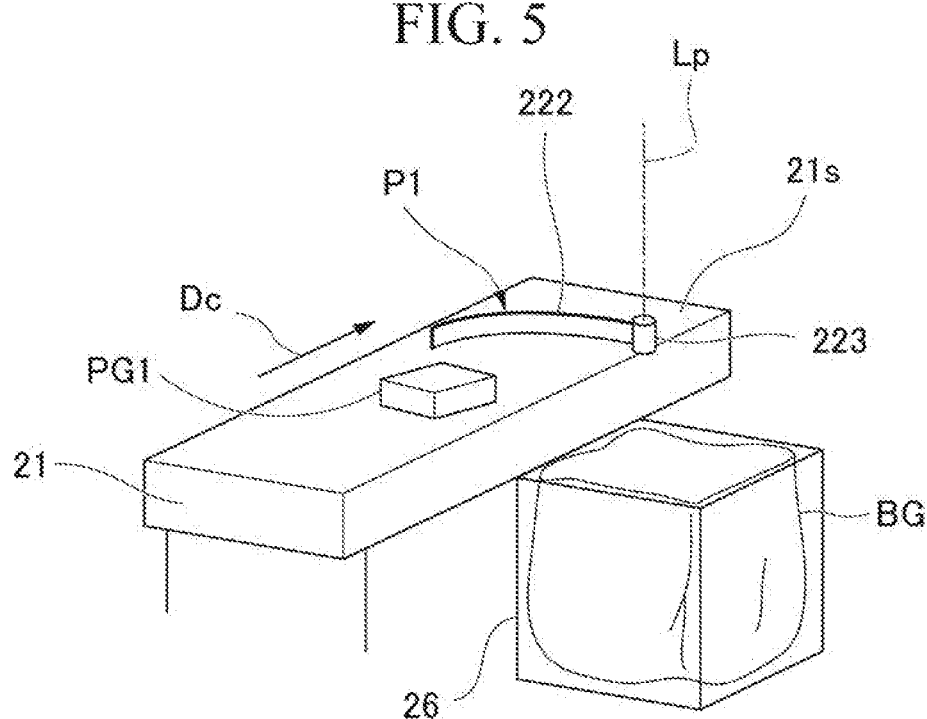
FIG. 5 is a perspective view showing the function of a first sorting mechanism according to an example embodiment.

While a first package PG1 to be kicked to the first table 26 is approaching the first arm 222, as shown in FIG. 5, the first arm 222 rotates in a direction opposite to the first rotation direction Dr1, moves to a first position P1 at which movement of the first package PG1 in the conveyance direction Dc is blocked, and prepares to kick the first package PG1.

Figure 6:
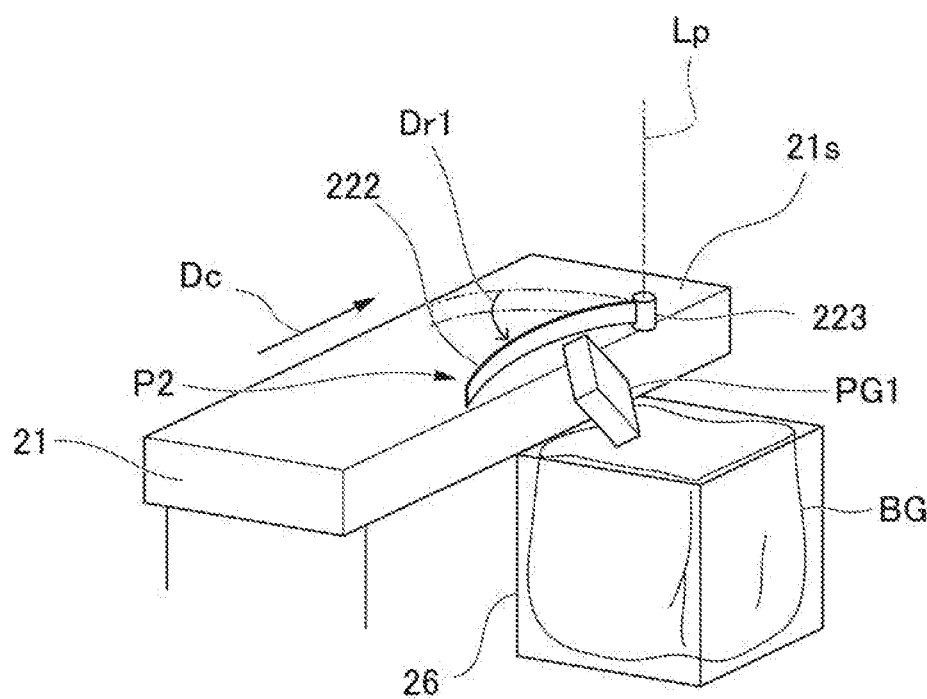
FIG. 6 is a perspective view showing the function of a first sorting mechanism according to an example embodiment.

When the first package PG1 to be kicked to the first table 26 passes through the first table 26, as shown in FIG. 6, the first arm 222 rotates in the first rotation direction Dr1, kicks the first package PG1 toward the first table 26, and reaches a second position P2.

For example, after the first package PG1 is kicked, the first arm 222 may prepare the first table 26 to cause a next package PG to pass through it and stand by at the second position P2 shown in FIG. 6.

At that time, when a next first package PG1 to be kicked approaches, the first arm 222 rotates in a direction opposite to the first rotation direction Dr1 and moves to the first position P1 shown in FIG. 5.

Figure 7:
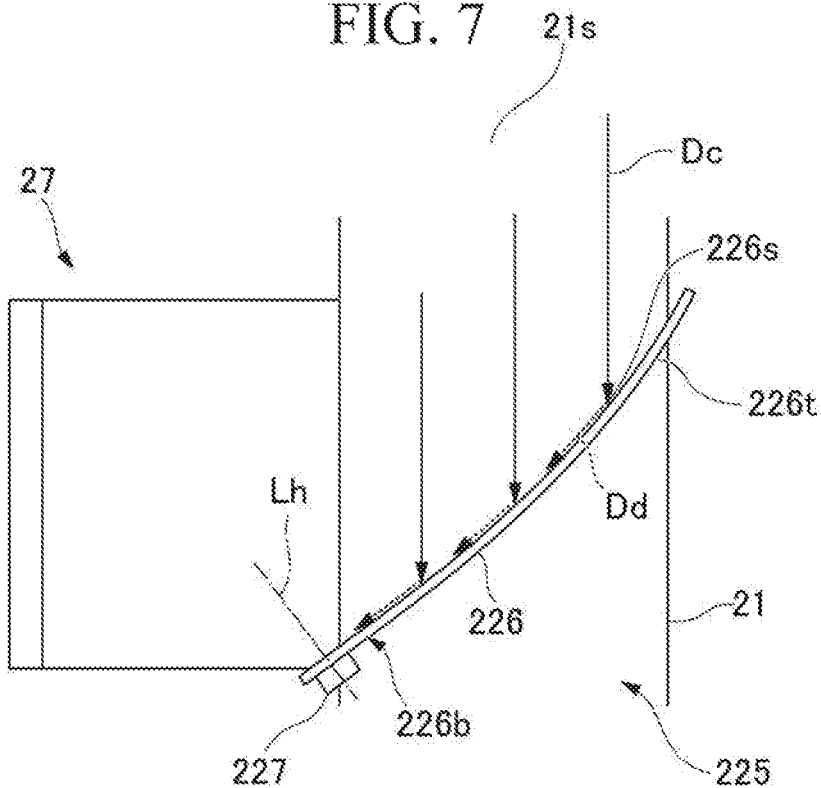
FIG. 7 is a plan view of a second sorting mechanism according to an example embodiment.

As shown in FIGS. 2 and 7, the second sorting mechanism 225 includes a second arm 226 and a second rotation shaft 227.

The second arm 226 turns a second package PG2 toward the second table 27.

As shown in FIG. 7, the second arm 226 includes a second arm base end 226b and a second arm tip end 226t.

The second arm 226 extends from the second arm base end 226b toward the second arm tip end 226t.

The second arm 226 further includes a second working surface 226s between the second arm base end 226b and the second arm tip end 226t.

For example, the second arm 226 has a shape extending along a circular arc and may have a second working surface 226s on the inner circumference side of the circular arc.

In accordance with the second working surface 226s, a second package PG2 flowing in the conveyance direction Dc moves to the second table 27 while moving in a diverting direction Dd along the second working surface 226s.

The second rotation shaft 227 is disposed on the downstream side of the second table 27 in the conveyance direction Dc.

The second arm base end 226*b* is fixed to the second rotation shaft 227.

The second rotation shaft 227 is driven to rotate around a horizontal line Lh extending horizontally with respect to the conveyance face 21*s* in accordance with an instruction from the control device 23.

In this way, the second arm 226 is driven to rotate around the horizontal line Lh on the conveyance face 21*s* along a face perpendicular to the conveyance face 21*s*.

For example, the horizontal line Lh may extend in a direction intersecting with the direction in which the second arm 226 extends.

In addition, the second arm 226 may be driven to rotate along a face that is perpendicular to the conveyance face 21*s* and intersects with the conveyance direction Dc.

The second rotation shaft 227 may be a rotation shaft of a motor or the like.

In accordance with rotation driving of the second rotation shaft 227, the second working surface 226*s* blocks a conveyance path of a second package PG2 flowing in the conveyance direction Dc and turns the second package PG2 in the diverting direction Dd.

Figure 8:
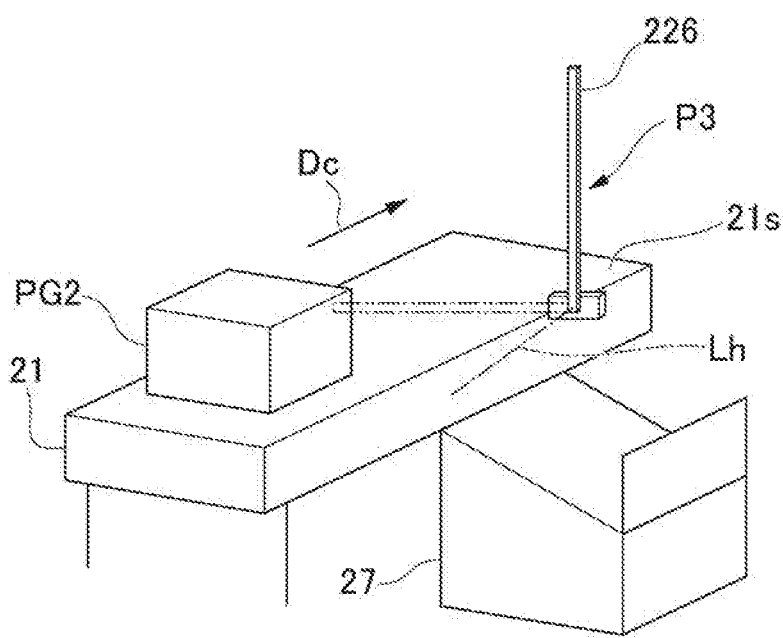
FIG. 8 is a perspective view showing the function of a second sorting mechanism according to an example embodiment.

When a second package PG2 to be turned aside approaches the second table 27, the second arm 226 rotates from a third position P3 at which it extends in the vertical direction shown in FIG. 8 and stands by toward the conveyance face 21*s*.

Figure 9:
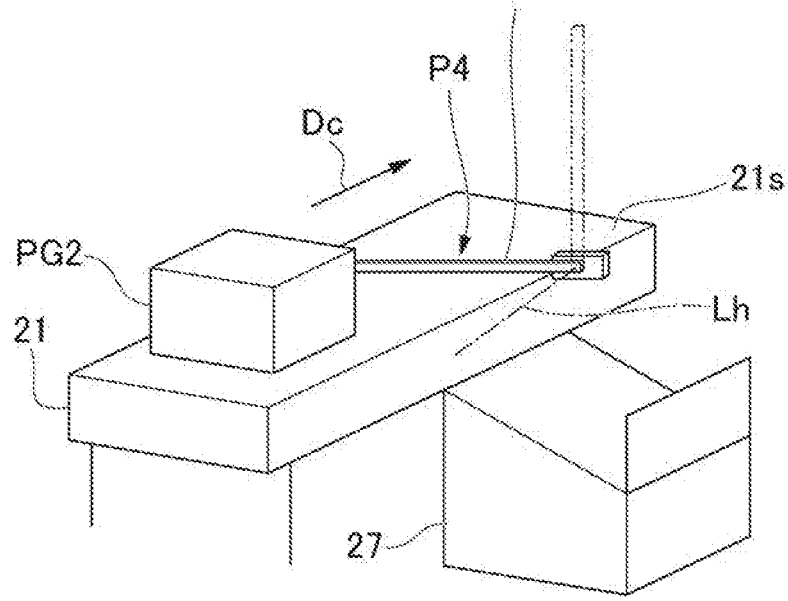
FIG. 9 is a perspective view showing the function of a second sorting mechanism according to an example embodiment.

In accordance with this rotation, the second arm 226 moves to a fourth position P4 at which it extends in the horizontal direction shown in FIG. 9, and movement of the second package PG2 in the conveyance direction Dc is blocked.

Figure 10:
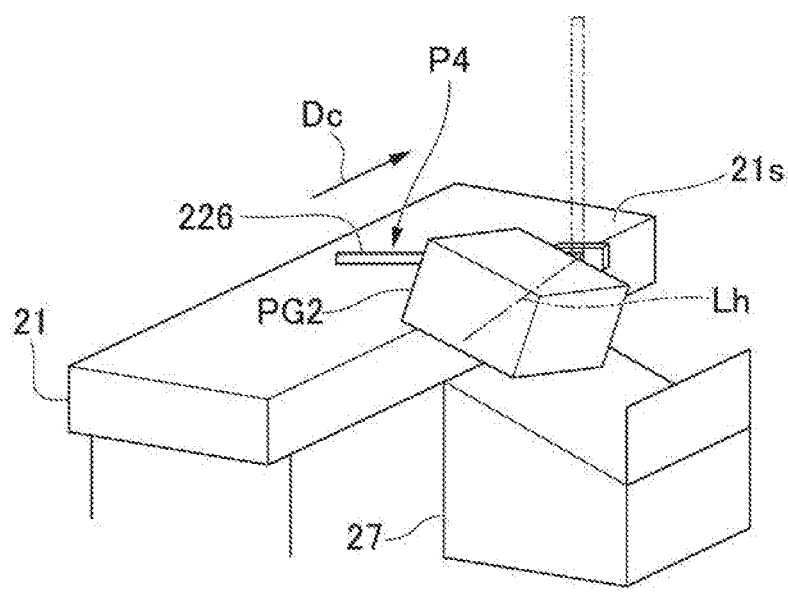
FIG. 10 is a perspective view showing the function of a second sorting mechanism according to an example embodiment.

When a second package PG2 flowing in the conveyance direction Dc is brought into contact with the second arm 226 positioned at the fourth position P4, the second package moves to the second table 27 as shown in FIG. 10 while moving in the diverting direction Dd along the second working surface 226*s*.

For example, after turning the second package PG2 aside, the second arm 226 may return to the third position P3 shown in FIG. 8 in preparation for a next package PG to be passed through the second table 27.

At that time, when the next second package PG2 to be turned aside approaches, the second arm 226 rotates toward the conveyance face 21*s* and moves to the fourth position P4 shown in FIG. 9.

(Configuration of First Table)

For example, as shown in FIG. 2, the first table 26 may be configured to be able to hold a bag BG.

At that time, the first table 26 may be configured to be able to hold the bag BG open.

In addition, the first table 26 may include a first casing 261 that holds the bag BG inside such that an opening OP of the bag BG faces up.

In addition, the first table 26 may be disposed at a position adjacent to the conveyance face 21*s* in the conveyance width direction Dcw.

Furthermore, a plurality of first packages PG1 may be piled up until they fill the inside of the bag BG.

For example, the first arm 222 may sort first packages PG1 inside the bag BG.

At that time, the first arm 222 may sort a first package PG1 to be kicked to the first table 26 into the inside of the bag BG by kicking it toward the opening OP.

For example, a plurality of first tables 26 may be disposed in relation to each delivery destination AD.

At that time, the plurality of first tables 26 may be aligned on both sides of the conveyance unit 21 in the conveyance width direction Dcw in the conveyance direction Dc in relation to each delivery destination AD.

(Configuration of Second Table)

The second table 27 includes a sliding board 271 as an inclined table.

For example, the second table 27 may include a second casing 272 that holds the sliding board 271 inside.

In addition, the sliding board 271 may have a downward inclination in a direction away from the conveyance unit 21 with respect to the conveyance width direction Dcw.

Furthermore, the second arm 226 may cause a second package PG2 to slide and fall along the sliding board 271 by turning the second package PG2 to be turned aside to the second table 27 toward the sliding board 271.

In addition, the second package PG2 slid along the sliding board 271 may be held inside the second casing 272 below the sliding board 271.

Furthermore, the second table 27 may be disposed at a position adjacent to the conveyance face 21*s* in the conveyance width direction Dcw.

For example, a plurality of second tables 27 may be disposed in relation to each delivery destination AD.

At that time, the plurality of second tables 27 may be aligned on both sides of the conveyance unit 21 in the conveyance width direction Dcw in the conveyance direction Dc in relation to each delivery destination AD.

In addition, the second table 27 may be disposed between first tables 26 aligned in the conveyance direction Dc.

For example, the second table 27 may be disposed at a position sharing delivery destinations AD adjacent to each other.

At that time, when first tables 26 adjacent to each other in the conveyance direction Dc are set as one pair, and a plurality of first tables 26 are sorted into a plurality of pairs sequentially from the upstream side in the conveyance direction Dc, a second table 27 may be disposed between a first table 26 and a first table 26 of each pair that have been sorted.

In other words, first tables 26 and second tables 27 may be aligned in order of a first table 26, a second table 27, a first table 26, a first table 26, a second table 27, a first table 26, a first table 26, a second table 27, . . . in the conveyance direction Dc.

(Configuration of Control Device)

Figure 11:
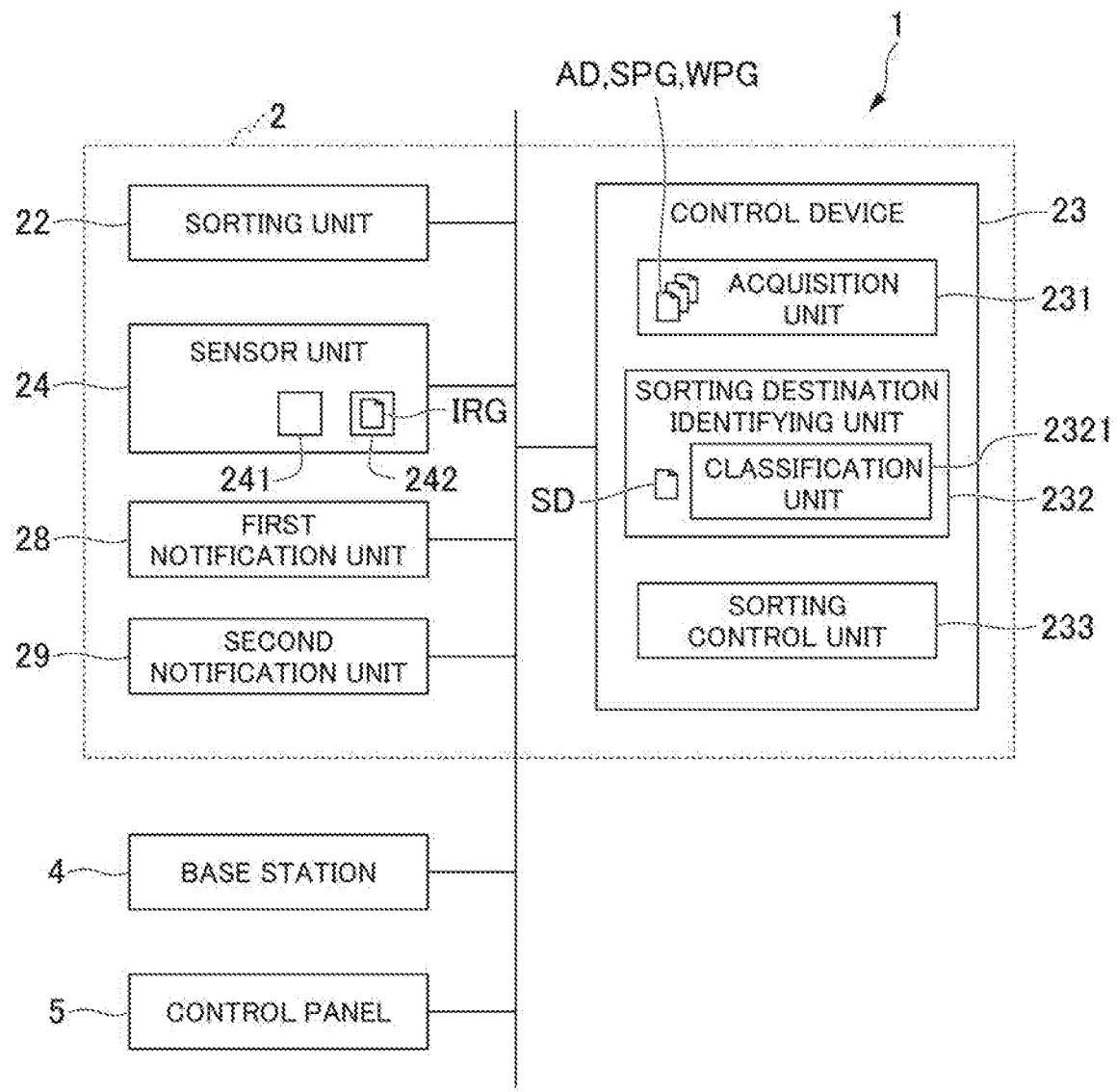
FIG. 11 is a block diagram of a sorting apparatus according to an example embodiment.

As shown in FIG. 11, the control device 23 functionally includes an acquisition unit 231, a sorting destination identifying unit 232, and a sorting control unit 233.

For example, the control device 23 may be communicatively connected to the sensor unit 24 and the sorting unit 22.

In addition, the control device 23 may be disposed near the conveyance unit 21.

The acquisition unit 231 acquires a delivery destination AD, a size SPG, and a weight WPG of each package PG for a plurality of packages PG conveyed by the conveyance unit 21.

For example, the acquisition unit 231 may acquire a delivery destination AD of each package PG on the basis of identification information read by the sensor unit 24.

At that time, the acquisition unit 231 may acquire a delivery destination AD of each package PG by identifying a delivery destination AD designated on the upstream side of the sensor unit 24 using identification information of each package PG read by the sensor unit 24.

In addition, the acquisition unit 231 may acquire a size SPG and a weight WPG of each package PG measured by the sensor unit 24.

The sorting destination identifying unit 232 identifies a sorting destination SD of each package PG on the basis of the delivery destination AD, the size SPG, and the weight WPG of each package PG acquired by the acquisition unit 231 such that a plurality of packages PG are sorted as first packages PG1 and second packages PG2.

For example, the sorting destination identifying unit 232 may functionally include a classification unit 2321.

The sorting destination identifying unit 232 identifies the first tables 26 as sorting destinations SD of packages PG classified as the first packages PG1 among packages PG classified by the classification unit 2321.

At that time, the sorting destination identifying unit 232 identifies the first table 26 relating to the delivery destination AD of the packages PG classified as the first packages PG1 among a plurality of first tables 26 as each sorting destination SD of packages PG classified as the first packages PG1.

In addition, the sorting destination identifying unit 232 identifies the first tables 26 as sorting destinations SD of packages PG classified as the second packages PG2 among packages PG classified by the classification unit 2321.

At that time, the sorting destination identifying unit 232 identifies the second table 27 relating to the delivery destination AD of the packages PG classified as the second packages PG2 among a plurality of second tables 27 as each sorting destination SD of packages PG classified as the second packages PG2.

For example, the classification unit 2321 may compare the size SPG and the weight WPG of each package PG with a set size and a set weight set in advance.

At that time, the classification unit 2321 may classify packages PG having the set size or less and the set weight or less as the first packages PG.

In addition, the classification unit 2321 may classify packages PG having sizes larger than the set size as the second packages PG2.

Furthermore, the classification unit 2321 may classify packages PG having weights larger than the set weight as the second packages PG2.

For example, the classification unit 2321 may classify paper bags in which books, clothing, and the like have been inserted as the first packages PG1.

In addition, the classification unit 2321 may classify cases in which a plurality of PET (polyethylene terephthalate) bottles filled with beverages, bottles filled with beer, and the like have been inserted as the second packages PG2.

The sorting control unit 233 controls the sorting unit 22 such that each package PG is sorted according to an identified sorting destination SD.

For example, for packages PG identified as the first packages PG1, the sorting control unit 233 may control the first sorting mechanism 221 of the first table 26 relating to a delivery destination AD identified by the sorting destination identifying unit 232 among first sorting mechanisms 221 of the first table 26 disposed in relation to each delivery destination AD.

In addition, for packages PG identified as the second packages PG2, the sorting control unit 233 may control the second sorting mechanism 225 of the second table 27 relating to a delivery destination AD identified by the sorting destination identifying unit 232 among second sorting mechanisms 225 of the second table 27 disposed in relation to each delivery destination AD.

(Configuration of Sensor Unit)

The sensor unit 24 includes a measurement unit 241 and a reading unit 242.

For example, a package PG that has flowed in from the upstream side of the sorting apparatus 2 using a belt conveyer or the like may pass through the sensor unit 24 and be conveyed into the sorting apparatus 2.

The measurement unit 241 measures a size SPG and a weight WPG of each package PG.

For example, the measurement unit 241 may measure the size SPG of each package PG using an optical measurement device or an ultrasonic wave measurement device.

In addition, the measurement unit 241 may measure the weight WPG of each package PG using a gravimeter.

The reading unit 242 reads identification information IRG attached to each package PG.

For example, the reading unit 242 may read identification information IRG from a label attached to each package PG using a bar code reader or optical character recognition (OCR).

(Configuration of Holding Table)

The holding table 25 is a table used for gathering packages PG that cannot be sorted into the first table 26 or the second table 27.

For example, packages PG that could not be judged by the sensor unit 24 or packages PG for which an error has occurred in the sorting apparatus 2 may be gathered on the holding table 25.

In addition, in a case in which packages PG cannot be sorted according to each sorting destination SD such as a case in which the bag BG or the sliding board 271 is full of packages PG or the like, the packages PG may be gathered on the holding table 25.

For packages PG gathered on the holding table 25, an appropriate delivery destination AD is determined by an operator, and the packages are loaded in a wheeled cart 3 relating to an appropriate delivery destination AD by an operator.

(Configuration of a First Notification Unit)

The first notification unit 28 notifies that the bag BG is full of first packages PG1.

For example, the first notification unit 28 may notify that the bag BG is full of first packages PG1 by turning a lamp on.

In addition, the first notification unit 28 may detect a weight of the bag BG including a plurality of first packages PG1 using a gravimeter or the like. At that time, the first notification unit 28 may detect that the bag BG is full of first packages PG1 on the basis of the weight of the bag BG including the plurality of first packages PG1.

In addition, the first notification unit 28 may detect a volume of a plurality of first packages PG1 filled inside the bag BG using an optical sensor or the like. At that time, the first notification unit 28 may detect that the bag BG is full of first packages PG1 on the basis of the volume of the plurality of first packages PG1 filled inside the bag.

In addition, the first notification unit 28 may be mounted in the first casing 261.

(Configuration of Second Notification Unit)

The second notification unit 29 notifies that a second package PG2 has been sorted into the second table 27.

For example, the second notification unit 29 may notify that a second package PG2 has been sorted into the second table 27 by turning on a lamp.

In addition, the second notification unit 29 may detect that a second package PG2 has slid and fallen along the sliding board 271 using an optical sensor or the like. At that time, the second notification unit 29 may detect that a second package PG2 has been sorted into the second table 27 on the basis of the second package PG2 that has slid and fallen.

For example, the second notification unit 29 may be mounted in the second casing 272.

In addition, in a case in which the second table 27 is disposed at a position sharing delivery destinations AD that are adjacent to each other, the second notification unit 29 may be mounted at the position of each of the upstream side and the downstream side of the second casing 272 in the conveyance direction Dc.

At that time, when a second package PG2 to be sorted according to the delivery destination AD of the upstream side has been sorted into the second table 27 out of the delivery destinations AD shared by the second table 27, the second notification unit 29 mounted at the position of the upstream side in the conveyance direction Dc out of the mounted second notification units 29 notifies that the second package PG2 has been sorted into the second table 27.

In this way, an operator can recognize that the second package PG2 sorted into the shared second table 27 is a second package PG2 to be sorted according to the delivery destination AD of the upstream side.

In addition, when a second package PG2 to be sorted according to the delivery destination AD of the downstream side has been sorted into the second table 27 out of the delivery destinations AD shared by the second table 27, it is notified that the second package PG2 has been sorted by the second notification unit 29 mounted at the position of the downstream side in the conveyance direction Dc out of the mounted second notification units 29.

In this way, an operator can recognize that the second package PG2 sorted into the shared second table 27 is a second package PG2 to be sorted according to the delivery destination AD of the downstream side.

(Configuration of Wheeled Cart 3)

Each of a plurality of wheeled carts 3 is related with one delivery destination AD.

For example, in relation to the delivery destination AD, the plurality of wheeled carts 3 may be aligned on both sides of the conveyance unit 21 in the conveyance width direction Dcw toward the conveyance direction Dc.

In addition, each wheeled cart 3 may be disposed near the first table 26 and the second table 27 of a relating delivery destination AD.

In addition, as shown in FIG. 1, respective eight wheeled carts 3 may be disposed to have line symmetry with respect to the center of the conveyance unit 21 in the conveyance width direction Dcw.

Furthermore, the wheeled cart 3 may be configured to be able to house the bag BG into which a plurality of first packages PG1 have been inserted and a second package PG2.

In addition, the wheeled cart 3 may be configured to be able to house a plurality of bags BG into which a plurality of first packages PG1 have been inserted and a plurality of second packages PG2.

For example, when the bag BG is full of first packages PG1, an operator may load first packages into a wheeled cart 3 of a delivery destination relating to the sorted first packages PG1.

In addition, when a second package PG2 has been sorted, the operator may load the second package into a wheeled cart 3 of a delivery destination relating to the sorted second package PG2.

Furthermore, when the wheeled cart 3 becomes full, the operator may convey the bag BG and the second packages PG2 by pressing a wheeled cart 3 in which the bag BG and the second packages PG2 are housed.

Figure 12:
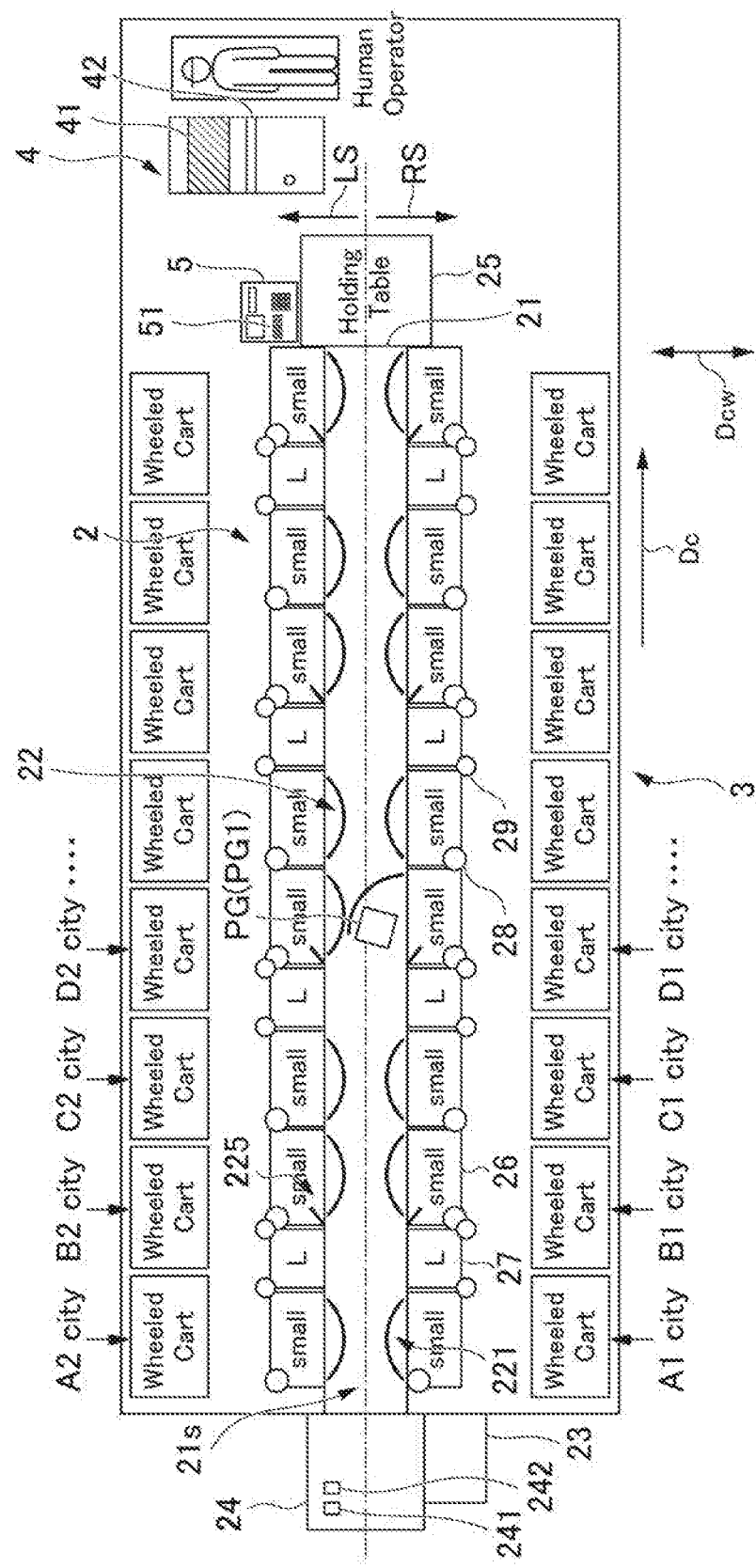
FIG. 12 is a plan view of a sorting apparatus according to an example embodiment.

For example, as shown in FIG. 12, wheeled carts 3 disposed on the right side RS of the conveyance unit 21 may be respectively associated with a city A1, a city B1, a city C1, a city D1 . . . as delivery destinations AD in order from the upstream side in the conveyance direction Dc.

In addition, wheeled carts 3 disposed on the left side LS of the conveyance unit 21 may be respectively related with a city A2, a city B2, a city C2, a city D2 . . . as delivery destinations AD in order from the upstream side in the conveyance direction Dc.

(Other Configuration)

The base station 4 is a device used by an operator for monitoring the state of the entire logistic system 1 including the sorting apparatus 2 and performing an operation on the entire logistic system 1.

For example, the base station 4 may include a monitoring unit 41 that provides monitoring information of the state of the entire logistic system 1 including the sorting apparatus 2 for an operator.

In addition, the base station 4 may further include an operation unit 42 that can be used for allowing an operator to operate the entire logistic system 1 including the sorting apparatus 2.

The control panel 5 is a device used for performing urgent stop of the entire logistic system 1 including the sorting apparatus 2 in accordance with an operator's operation.

For example, the control panel 5 may include an urgent stop button 51 that can be used by an operator performing urgent stop of the entire logistic system 1 including the sorting apparatus 2.

(Operation)

An operation of the control device 23 according to this example embodiment will be described.

An operation of the control device 23 corresponds to a method of controlling the sorting unit 22 according to an example embodiment.

When a package PG flows from the upstream side of the sorting apparatus 2 to the conveyance unit 21, as shown in FIG. 13, the acquisition unit 231 acquires a delivery destination AD, a size SPG, and a weight WPG of the package PG conveyed by the conveyance unit 21 (ST01: Step of acquiring a delivery destination, a size, and a weight).

After execution of ST01, the sorting destination identifying unit 232 identifies a sorting destination SD of the package PG on the basis of the delivery destination AD, the size SPG, and the weight WPG acquired by the acquisition unit 231 such that a plurality of packages PG are sorted as first packages PG1 and second packages PG2 (ST02: Step of identifying a sorting destination).

After execution of ST02, the sorting control unit 233 controls the sorting unit 22 such that each package PG is sorted according to an identified sorting destination SD (ST03: Step of controlling the sorting unit).

For example, in a case in which each wheeled cart 3 is related as shown in FIG. 12, the sorting control unit 233 controls the first sorting mechanism 221 of the first table 26 approaching the wheeled cart 3 assigned to the city C1 for a package PG of which the sorting destination SD is identified by the sorting destination identifying unit 232 as "a first package PG1 to be delivered to the city C1".

(Operation and Effect)

According to this example embodiment, the sorting apparatus 2 can sort a plurality of packages PG on the basis of a delivery destination AD, a size SPG, and a weight WPG such that the packages PG are sorted as first packages PG1 and the second packages PG2 by sorting packages PG that are lighter and smaller than second packages PG2 as the first packages PG.

For this reason, the sorting apparatus 2 can sort packages PG into the first packages PG1 and the second packages PG2 and can sort them into respective delivery destinations AD.

Accordingly, a burden on the operator is reduced.

In addition, according to this example embodiment, the sorting apparatus 2 can sort the first packages PG1 into the first table 26 that can hold the bag BG.

In this way, the sorting apparatus 2 can gather a plurality of first packages PG1 sorted into the first table 26 into the bag BG.

Accordingly, the sorting apparatus 2 can decrease a space used for gathering first packages PG1.

In addition, an operator can load a plurality of first packages PG1 into the wheeled carts 3 in units of the bags BG, and accordingly, a burden on the operator is reduced.

Furthermore, an operator can pile a plurality of first packages PG1 for each bag BG on second packages PG2 piled inside the wheeled carts 3, and accordingly, a burden on the operator is reduced.

In order to put packages in a wheeled cart as many as possible, an operator needs to put packages PG that are relatively large and heavy on a lower side of the wheeled cart and put packages that are relatively small and light on an upper side of the wheeled cart.

For this, the sorting apparatus 2 according to this example embodiment, as described above can load a plurality of first packages PG1 in the wheeled cart 3 for each bag BG.

For this reason, even in a case in which a second package PG2 is sorted after bags BG including first packages PG1 have already been put in the wheeled cart 3, after each bag BG is taken out from the wheeled cart 3 once, and the second package PG2 is put into the wheeled cart, the bags BG can be returned and piled.

Accordingly, even in a case in which reload of packages PG in the wheeled cart 3 is necessary, an operator can handle it in a short time.

In addition, according to this example embodiment, first packages PG1 can be kicked toward the first table 26 by the first arm 222.

For this reason, the sorting apparatus 2 can quickly sort first packages PG1 into the first table 26.

In addition, according to this example embodiment, the first arm 222 can sort first packages PG1 into the inside of the bag BG.

For this reason, the sorting apparatus 2 can cause first packages PG1, which should be sorted into the first table 26, to fall into the inside of the bag BG.

In addition, according to this example embodiment, the sorting apparatus 2 can notify an operator of the bag BG being full of first packages PG1 using the first notification unit 28.

For this reason, the operator can perform a countermeasure at a time point at which the bag BG is full of first packages PG1.

In addition, according to this example embodiment, the sorting apparatus 2 can sort second packages PG2 into the second table 27 including the sliding board 271.

In this way, the sorting apparatus 2 can cause second packages PG2 sorted into the second table 27 to slide and fall along the sliding board 271.

For this reason, the sorting apparatus 2 can move the second packages PG2 near the wheeled cart 3 in accordance with the own weights of the second packages PG2.

Accordingly, an operator's operation of loading second packages PG2 into the wheeled cart 3 is reduced.

In addition, according to this example embodiment, the sorting apparatus 2 can turn second packages PG2 toward the second table 27.

For this reason, the sorting apparatus 2 can sort second packages PG2 into the second table 27 with a relative small force while using the inertial force of the conveyance unit 21.

In addition, according to this example embodiment, the sorting apparatus 2 can notify an operator of a second package PG2 having been sorted into the second table 27 by using the second notification unit 29.

For this reason, the operator can perform a countermeasure at a time point at which the second package PG2 is sorted into the second table 27.

In addition, according to this example embodiment, as shown in FIG. 14, the sorting apparatus 2 can sort first packages PG1 into the inside of the bag BG and sort second packages PG2 on the sliding board 271.

For example, at an actual site, there are cases in which the number of first packages PG1 that are small and light occupies about 80 to 90 percent.

For this, according to the sorting apparatus 2 of this example embodiment, an operator can load first packages PG1 that are small and light into the wheeled cart 3 for each bag BG.

Furthermore, according to the sorting apparatus 2 of this example embodiment, an operator can load large second packages PG2 and heavy second packages PG2 into the wheeled cart 3 in a state of being moved near the wheeled cart 3.

For this reason, for example, a work of four operators can be sufficiently executed by one operator.

For example, an arm robot and the like cannot handle a broad range of packages including small and light packages to large and heavy packages and cannot catch up with the fluid velocity of packages.

In addition, in a case in which an arm robot is installed, an installation floor area also needs to be enlarged.

For this, according to the sorting apparatus 2 of this example embodiment, instead of full automation or an unmanned operation, by using an approach for decreasing the number of operators, for example, from four to one, a solution that can be introduced at a reasonable cost can be provided.

In addition, since an arm robot does not need to be installed, the installation floor area can be reduced as well.

Modified Example

In the example embodiment described above, although the first notification unit 28 performs notification using turning-on of a lamp, any method may be used as long as the bag BG being full of first packages PG1 can be notified.

As a modified example, the first notification unit 28 may give a notification of the bag BG being full of first packages PG1 using sound generation of a siren.

As another modified example, the first notification unit 28 may give a notification of the bag BG being full of first packages PG1 using display of a display.

In the example embodiment described above, although the second notification unit 29 performs notification using turning-on of a lamp, any method may be used as long as it can be notified that a second package PG2 has been sorted into the second table 27.

As a modified example, the second notification unit 29 may notify that a second package PG2 has been sorted into the second table 27 using sound generation of a siren.

As another modified example, the second notification unit 29 may give a notification of a second package PG2 being sorted into the second table 27 using display of a display.

In the example embodiment described above, although it is detected and notified by the first notification unit 28 that the bag BG becomes full of first packages PG, a part of the function may be included in the control device 23.

As a modified example, the control device 23 may judge that the bag BG becomes full of first packages PG1 on the basis of detection information acquired by each sensor and send an instruction for causing the first notification unit 28 to give a notification thereof.

In the example embodiment described above, although it is detected and notified by the second notification unit 29 that a second package PG2 has been sorted into the second table 27, a part of the function may be included in the control device 23.

As a modified example, the control device 23 may judge that a second package PG2 has been sorted into the second table 27 on the basis of detection information acquired by each sensor and send an instruction for causing the second notification unit 29 to give a notification thereof.

In the example embodiment described above, although the acquisition unit 231 acquires a delivery destination AD of each package PG on the basis of the identification information IRG read by the sensor unit 24, any acquisition method may be used as long as the delivery destination AD of each package PG can be acquired.

As a modified example, the acquisition unit 231 may acquire a delivery destination AD from the sensor unit 24. At that time, the sensor unit 24 may read a delivery destination AD attached to each package PG.

In the example embodiment described above, although the acquisition unit 231 acquires the size SPG and the weight WPG of each package PG measured by the sensor unit 24, any acquisition method may be used as long as the size SPG and the weight WPG of each package PG can be acquired.

As a modified example, the acquisition unit 231 may acquire a delivery destination AD, a size SPG, and a weight WPG on the basis of the identification information IRG read by the sensor unit 24.

At that time, the acquisition unit 231 may acquire a size SPG and a weight WPG of each package PG by identifying a size SPG and a weight WPG of each package PG that have already been measured on the upstream side of the sensor unit 24 using the identification information IRG of each package PG read by the sensor unit 24.

In the example embodiment described above, although the first sorting mechanism 221 sorts first packages PG1 into the first table 26 by kicking them, and the second sorting mechanism 225 sorts second packages PG2 by turning them aside, any other sorting method may be used.

As a modified example, a roller conveyer is disposed in the conveyance unit 21, and a mechanism that changes the conveyance direction by rotating the roller conveyer in the conveyance face 21s may be disposed as the first sorting mechanism 221 and the second sorting mechanism 225.

In the example embodiment described above, although packages PG are sorted according to 16 delivery destinations AD as delivery destinations AD relating to each wheeled cart 3, the numbers of delivery destinations AD and wheeled carts 3 may be arbitrary set.

Second Example Embodiment

Figure 15:
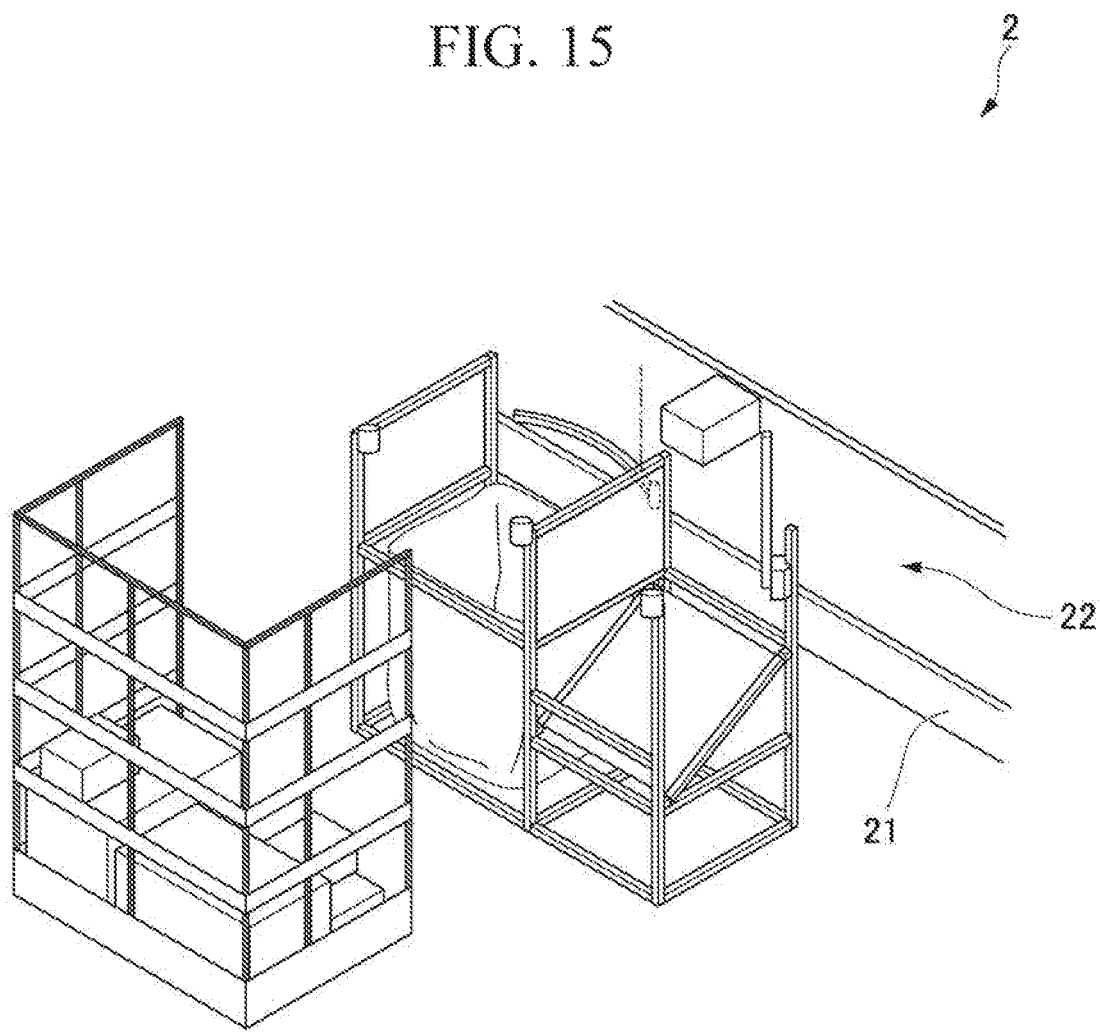
FIG. 15 is a perspective view of a sorting apparatus according to an example embodiment having a minimum configuration.

Hereinafter, a minimum configuration of a sorting apparatus according to an example embodiment of the present disclosure will be described with reference to FIG. 15.

The sorting apparatus 2 includes a conveyance unit 21 and a sorting unit 22.

The conveyance unit 21 conveys a plurality of packages.

The sorting unit 22 sorts a plurality of packages on the basis of a delivery destination, a size, and a weight such that the plurality of packages are sorted as first packages and second packages.

The sorting unit 22 sorts packages lighter and smaller than the second packages as the first packages.

According to this example embodiment, the sorting apparatus 2 can sort a plurality of packages on the basis of a delivery destination, a size, and a weight such that the packages are sorted as first packages and second packages by setting packages lighter and smaller than the second packages as the first packages.

For this reason, the sorting apparatus 2 can sort packages into the first packages and the second packages and can sort the packages into delivery destinations.

Therefore, a burden on an operator is reduced.

Third Example Embodiment

Figure 16:
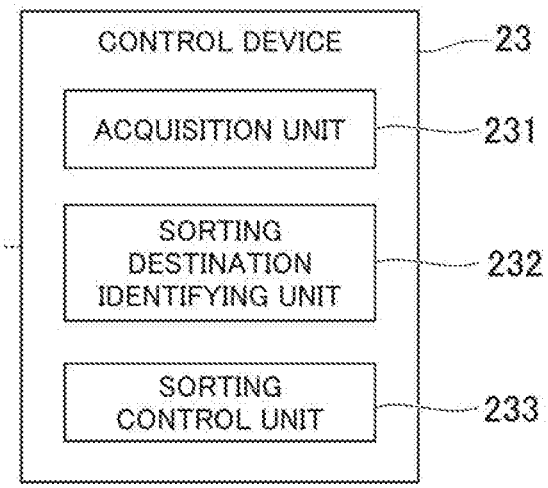
FIG. 16 is a block diagram of a control device according to an example embodiment having a minimum configuration.

Hereinafter, a minimum configuration of a control device according to an example embodiment of the present disclosure will be described with reference to FIG. 16.

The control device 23 includes an acquisition unit 231, a sorting destination identifying unit 232, and a sorting control unit 233.

The acquisition unit 231 acquires a delivery destination, a size and a weight of each package for a plurality of packages conveyed by the conveyance unit.

The sorting destination identifying unit 232 identifies a sorting destination of each package on the basis of a delivery destination, a size, and a weight such that the plurality of packages are sorted as first packages and second packages.

The sorting destination identifying unit 232 identifies a package lighter and smaller than the second package as a first package.

The sorting control unit 233 controls the sorting unit such that each package is sorted according to the identified sorting destination.

According to this example embodiment, the control device 23 can sort a plurality of packages on the basis of a delivery destination, a size, and a weight such that the packages are sorted as first packages and second packages by setting packages lighter and smaller than the second packages as the first packages.

For this reason, the control device 23 can sort packages into the first packages and the second packages and can sort the packages into delivery destinations.

Therefore, a burden on an operator is reduced.

Fourth Example Embodiment

In each example embodiment described above, one example of the hardware configuration for realizing the control device 23 will be described with reference to FIG. 17.

Figure 17:
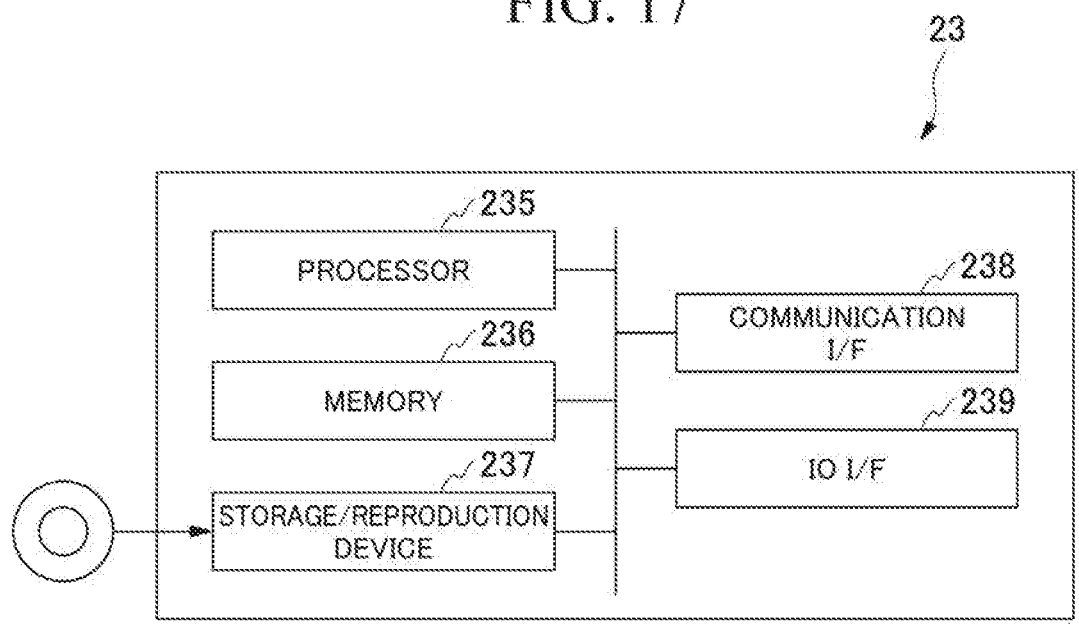
FIG. 17 is a block diagram showing an example of the hardware configuration of a control device according to each example embodiment.

As shown in FIG. 17, the control device 23 is a computer including hardware such as a processor 235, a memory 236, a storage/reproduction device 237, a communication interface (communication I/F) 238, an input output interface (IO I/F) 239, and the like.

The processor 235, for example, is a central processing unit (CPU).

The memory 236 is a storage medium such as a random access memory (RAM), a read only memory (ROM), or the like.

The storage/reproduction device 237 is a device for storing a program, data, and the like in an external medium such as a CD-ROM, a DVD, a flash memory, or the like and reproducing a program, data, and the like stored in an external medium.

The communication I/F 238 is an interface for performing communication between the control device 23 and other devices through communication lines such as the Internet, a dedicated communication line, and the like.

The IO I/F 239 is an interface for inputting a source program and performing input/output and the like of information and the like between the control device 23 and other devices.

Fifth Example Embodiment

In each example embodiment described above, a program used for realizing all or some of the functions of the control device 23 may be stored in a computer-readable storage medium, and the process of each unit may be performed by causing a computer system to read the program stored in this storage medium and execute the program.

A "computer system" described here includes an OS and hardware such as peripherals and the like.

In addition, the "computer system" also includes a home page providing environment (or a display environment) in a case in which a WWW system is used.

A "computer-readable storage medium" represents a storage device including a portable medium such as a flexible disk, a magneto-optical disc, a ROM, or a CD-ROM, a hard disk built in a computer system, and the like.

Furthermore, a "computer-readable storing medium" also includes a medium dynamically storing the program for a short time such as a communication line in a case in which the program is transmitted through a network such as the Internet or a communication line such as a telephone circuit line.

In addition, a "computer-readable storage medium" also includes a medium storing a program for a fixed time such as a volatile memory inside a computer system serving as a server or a client in a case in which the program is transmitted through a network such as the Internet or a communication line such as a telephone line.

For example, the program described above may be used for realizing a part of the functions described above and, furthermore, may be a program realizing the functions described above by being combined with a program stored in the computer system in advance.

The sorting apparatus disclosed in Patent Document 1 sorts packages having light weights and packages having heavy weights into different discharge positions.

However, the sorted packages need to be sorted according to delivery destinations, and thus there is a heavy burden on an operator.

An example advantage according to the present disclosure is that a burden on an operator is reduced.

As above, while the example embodiments of the present disclosure have been described, these example embodiments are presented as examples and are not intended to limit the scope of the present disclosure. These example embodiments can be performed in other various forms, and, in a range not departing from the concept of the present disclosure, various omissions, substitutions, and changes can be performed.

What is claimed is:

1. A sorting apparatus comprising:
   a conveyor that conveys a plurality of packages;
   a first arm;
   a second arm;
   a memory configured to store instructions;
   a processor configured to execute the instructions to:
   identify a sorting destination of each of the plurality of packages on the basis of a delivery destination, a size, and a weight such that the plurality of packages are sorted as first packages and second packages, the first packages being lighter and smaller than the second packages; and
   sort each package according to the identified sorting destination by using the first arm and the second arm; and
   a table,
   wherein the first arm is configured to sort the first packages onto the table, and
   wherein the first arm is configured to sort the first packages to the inside of a bag held by the table.

2. The sorting apparatus according to claim 1, wherein the first arm is configured to kick the first packages toward the table.

3. The sorting apparatus according to claim 1, further comprising an alarm notifying that the bag has become full of the first packages.

4. The sorting apparatus according to claim 1,
   wherein the processor is configured to execute the instructions to acquire the delivery destination, the size, and the weight of each package.

5. The sorting apparatus according to claim 4, further comprising a measuring sensor that is configured to measure the size and the weight of each package,
   wherein acquiring includes acquiring the size and the weight that have been measured.

6. The sorting apparatus according to claim 4, further comprising a reading sensor that is configured to read identification information attached to each package,
   wherein the acquiring includes acquiring the delivery destination, the size, and the weight on the basis of the read identification information.

7. A logistic system comprising:
   the sorting apparatus according to claim 1; and
   a plurality of wheeled carts each related to one delivery destination.

8. A sorting apparatus comprising:
   a conveyor that conveys a plurality of packages;
   a first arm;
   a second arm;
   a memory configured to store instructions;
   a processor configured to execute the instructions to:
   identify a sorting destination of each of the plurality of packages on the basis of a delivery destination, a size, and a weight such that the plurality of packages are sorted as first packages and second packages, the first packages being lighter and smaller than the second packages; and
   sort each package according to the identified sorting destination by using the first arm and the second arm; and a table including a sliding board,
wherein the second arm is configured to sort the second packages onto the table, and
wherein the sorting apparatus further comprises an alarm notifying that the second packages have been sorted onto the table.

* * * * *